US006345906B1

(12) United States Patent
Bahne et al.

(10) Patent No.: US 6,345,906 B1
(45) Date of Patent: Feb. 12, 2002

(54) LAMP FOR MOTOR VEHICLES

(75) Inventors: Johannes J. Bahne, Ense; Susanne Pfarr; Reiner Pohl, both of Lippstadt, all of (DE)

(73) Assignee: Hella KG Hueck & Co., Lippstadt (DE)

(*) Notice: Subject to any disclaimer, the term of this patent is extended or adjusted under 35 U.S.C. 154(b) by 0 days.

(21) Appl. No.: 09/598,150

(22) Filed: Jun. 21, 2000

Related U.S. Application Data

(63) Continuation of application No. PCT/EP99/08985, filed on Nov. 22, 1999.

(30) Foreign Application Priority Data

Nov. 23, 1998 (DE) ........................................ 198 53 879

(51) Int. Cl.[7] ............................ B60Q 3/04; B62J 6/00

(52) U.S. Cl. ........................ 362/543; 362/475; 362/476

(58) Field of Search ................................ 362/543, 476, 362/475, 367, 370, 227, 249, 516, 544, 210, 217

(56) References Cited

U.S. PATENT DOCUMENTS

| | | | |
|---|---|---|---|
| 4,796,165 A | | 1/1989 | Metti |
| 4,812,955 A | | 3/1989 | Beswick et al. |
| 5,321,588 A | * | 6/1994 | Weddemann et al. ....... 362/543 |

FOREIGN PATENT DOCUMENTS

| | | |
|---|---|---|
| DE | 29618562 U1 | 1/1997 |
| DE | 12-9807774 | 8/1998 |
| DE | 11-9721596 | 12/1998 |
| EP | 0418009 A2 | 3/1991 |
| EP | 0795718 A1 | 9/1997 |
| GB | 2095388 | 9/1982 |

* cited by examiner

*Primary Examiner*—Sandra O'Shea
*Assistant Examiner*—Bao Truong

(57) ABSTRACT

The invention is a lamp (1) for motor vehicles, especially a rear lamp. The lamp includes a plurality of chambers each having a light source. The chambers are arranged adjacent to one another and each represents an illumination unit (3). Each illumination unit has a pot-shaped housing (6) with a light source. An opening of each housing is closed by a covering pane (7). The lamp is also provided with a locking device (13) with elements for fixing the illumination units to a common support (2).

14 Claims, 2 Drawing Sheets

18
19
17
14
20
15
13
1
3
3
3
4
7
2
5
8
6

LAMP FOR MOTOR VEHICLES

This appln is a con't of PCT/EP99/08985 filed Nov. 22, 1999.

The invention concerns a lamp for motor vehicles, especially a rear lamp, with several chambers arranged next to each other, each having a light source.

Patent document EP 0 48 009 A2 discloses a lamp for motor vehicles which is protected from damage by a protective grating. A plurality of parallel-extending struts are provided, which are affixed in a region of the car body bordering the lamp. The struts of the grating extend at a spacing from an outer side of a covering pane of the lamp. In order to affix the struts, strips are provided, with a profiled first strip having a bore that aligns with a bore of the car body for bindingly holding a bolt in the bore in the car body. Otherwise, a strip is provided onto which axially extending pins are formed, which grasp in a binding manner into a groove of a rubber-like strip, which is connected to the car body by adhesive. A holding of the lamp itself by this grating is not disclosed.

Patent document EP 0 795 718 A1 discloses a lamp for motor vehicles which has a plurality of chambers, in each of which a light source is arranged. The chambers, however, are arranged in a common pot-shaped housing, an opening of which is covered by a covering pane. It is disadvantageous in this known lamp, that by a rigid connection of the chambers, in particular, by fixed predetermined structures of the reflectors, lamp functions and/or a division of lamp functions within the housing are predetermined. The covering pane is connected by inter-engagement with the housing.

Patent document DE 296 18 562 U1 discloses a lamp for motor vehicles having a housing with many chambers, each with a light source. An opening of such a pot-shaped housing is closed by a covering pane. Plug elements are provided at an outer edge of the housing with which a socket piece can be attached. The socket piece is preferably constructed as a rear reflector. An expense for manufacturing can be reduced by manufacturing a housing and a socket piece together. It is disadvantageous in this known lamp, that for a symmetrical arrangement of the lamp, supports having varying shapes are necessary to accommodate the housing and the socket piece.

It is an object of this invention therefore to further develop a lamp for motor vehicles which ensures, on the one hand, an increased variability, and on the other hand, a simplified replaceability of the lamp.

In order to achieve this object, the invention, in connection with limitations set forth in the preamble of the main claim, is characterized in that chambers are each formed as lamp units with a pot-shaped housing having a light source, an opening of the housing being closed by a covering pane, and in that a locking device is provided with mechanisms to attach the lamp units to a common support.

An advantage of a lamp according to the invention is particularly provided by having separate lamp units, which creates a modular design of a lamp. Each lamp unit is allocated a specific lamp function. Lamp functions are predetermined by construction of illumination structural components, for example a reflector or a covering pane, of individual lamp units. In this way, a lamp can be created with any desired arrangement of lamp functions. Advantageously, even after manufacture of the lamp, the arrangement of the lamp units within the lamp can be changed, so that a highest degree of variability is provided. Furthermore, a locking device makes it so that one or more lamp units can be removed or replaced in a simple way. The handling of replacement of a light source is especially made easier in that after removal of a lamp unit, a light source can be removed at a rear side of the lamp unit and another can be inserted again. The covering pane does not need to be removed from the housing.

According to a particular embodiment of the invention, the locking device has a holding element which is affixed to the support and can be brought into a locking position at edge areas of the lamp units. By bringing the holding element into the edge areas of the lamp units, on the one hand, a secure seating of the lamp units is ensured and, on the other hand, only small portions of lamp emission surfaces thereof are covered.

According to another embodiment, the holding element is constructed so that it is long and extends along a longitudinal edge of the lamp. Preferably, the holding element is constructed as a single piece and can thus function as a border or trim strip for the lamp. By the long construction of the holding element, several lamp units can be unlocked or locked in an uncomplicated way.

According to an embodiment of the invention, the holding element is constructed as a U-shaped bracket, free ends of which are coupled to the support. In this way, the holding element can be brought into the locking or unlocking positions by pivoting it about a pivot axis extending parallel to it.

According to an embodiment of the invention, the ends of the bracket are coupled to a rear side of the support. In this way, a small curvature of the pivot path of the holding element is created during unlocking or locking, which simplifies handling. In addition, when the ends are linked at an upper edge area of the rear side of the support, gravitational force of the holding element can be used to bring it into the locking position.

According to an additional embodiment of the invention, a safety element is allocated to the bracket and creates a clear locking position of the bracket by affixing the bracket to th e support and furthermore, allows a secure mounting of the bracket on the support.

According to another embodiment of the invention, each of the lamp units has on its rear side a contact element, which can be connected by a plug-in connection to a second contact element of the support. Preferably, the contact element of the lamp unit can be constructed as a plug element, which automatically snaps to the second contact element of the support. In this way, mechanical and electrical connections are simultaneously created, so that, particularly in the unlocking position of the holding element, a detaching of the lamp unit from the support is prevented. By appropriate guides of the lamp-surrounding car body parts, the lamp units can be clamped in an opening formed by the car body, ensuring a secure mechanical mounting. This can, for example, be done by flexible tongues, under pre-tension, projecting from the car body part.

According to another embodiment of the invention, an outer side of the holding element can be used to arrange an optical element on it. This can preferably be a rear reflector. As an alternative, the optical element can also be constructed as an active structural component, with the long holding element functioning as a cable channel to conduct electrical energy.

According to a further embodiment of the invention, the lamp units have the same dimensions, so that in an uncomplicated way, a changing arrangement of the lamp functions within the lamp is ensured.

An embodiment of the invention is explained in greater detail using the drawings.

Shown are:

Figure 1:
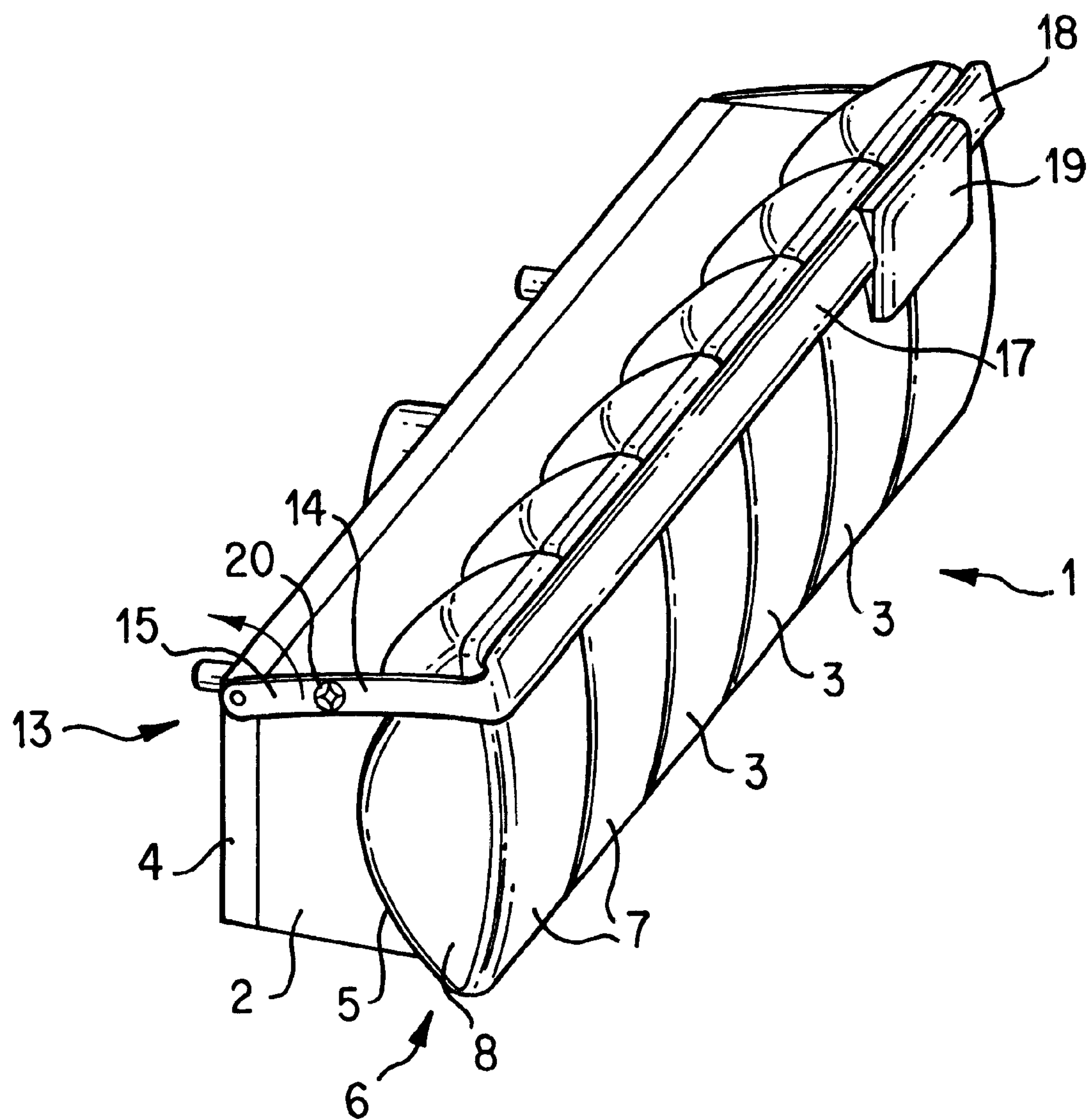
FIG. 1 is a perspective view of a lamp.
Figure 2:
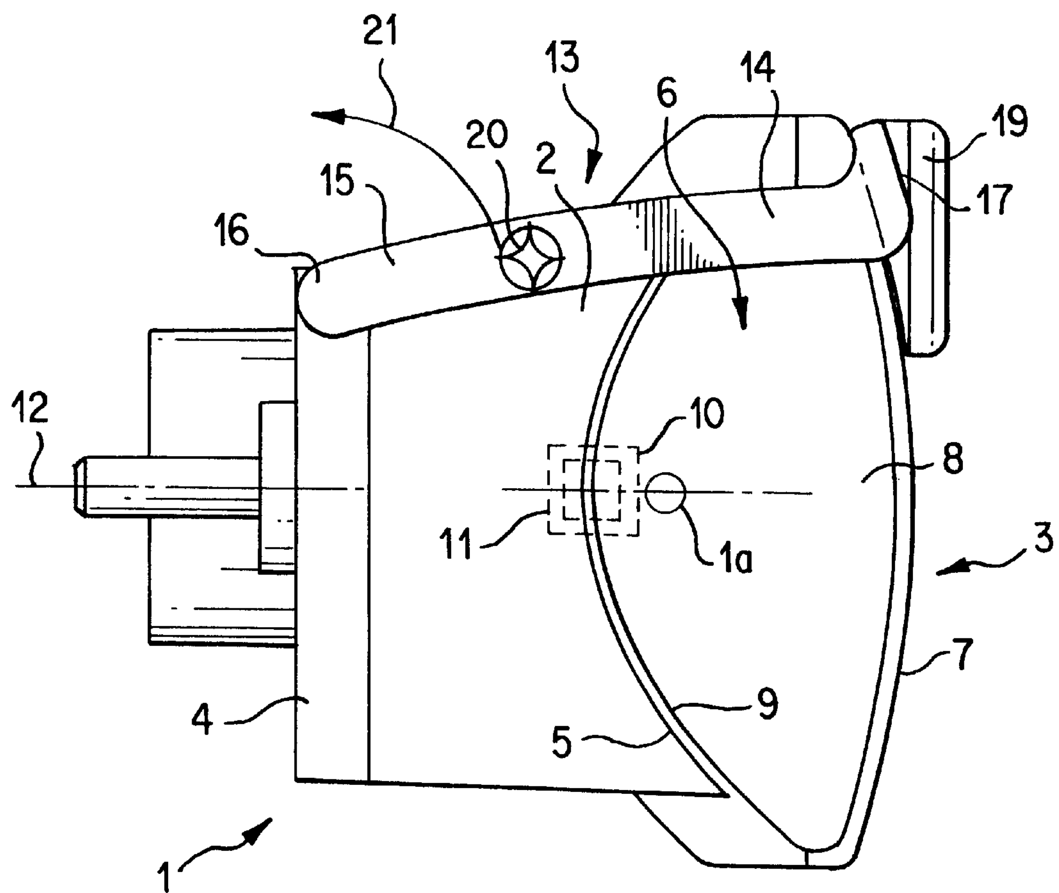
FIG. 2 is a side view of the lamp.

A lamp 1 shown in FIGS. 1 and 2 comprises essentially a support 2 and a plurality of lamp units 3 arranged on a front side of the support 2. The lamp 1 is set in a car-body opening of a motor vehicle (not shown) and serves preferably as a rear lamp.

The support 2 is cuboid shaped, with a rear wall 4 of the support 2 being structured to have a rectangular shape. A front wall 5 of the support 2 is structured to have a concave shape. The front wall 5 extends about a series of adjacent lamp units 3. The lamp units 3 are each structured the same, with each having a pot-shaped housing 6 which is closed by a covering pane 7. The covering pane 7 can be structured as a clear pane without optical properties. The covering pane 7 is structured to be slightly arched and is connected with an edge of the housing 6 by interlocking parts.

The housing 6 has opposite parallel sidewalls 8, which are connected to each other by a convex rear wall 9. A form of the rear wall 9 corresponds to a form of the front wall 5 of the support 2.

Each lamp unit 3 has in an interior space a light source la and a reflector. The lamp units 3 perform respectively different lamp functions from each other, for example, a brake lamp, rear fog lamp, reverse driving lamp, etc. For this purpose, each light-source socket is electrically and mechanically attachable to a first contact element 10 of the housing 6. This contact element 10 is arranged on the rear wall 9 of the housing 6 and is electrically and mechanically attachable to a second contact element 11 of the support 2. This connection is done preferably by a plug connection or an automatic snap-in connection in a direction of an optical axis 12 of the lamp unit 3.

For a secure attachment of the adjacently-arranged lamp units 3 on the support 2, a locking device 13 is provided, which includes a U-shaped bracket 14 set in bearings so that it can rotate on the rear wall 4 of the support 2. For this purpose, the bracket 14 has two parallel legs 15, whose free ends 16 are coupled so that they can pivot on an upper edge of the rear wall 4 of the support 2. A holding element 17 is connected at a front end of the bracket 14, which is structured as a mounting rail and rests, in a locking position of the bracket 14, on edge areas of the lamp units 3 and clamps them in a mounted position.

According to the above embodiment, the holding element 17 extends along upper edge areas of the lamp units 3 and thus forms a transition from the lamp units 3 to the connecting car body part (not shown). The holding element 17 can preferably be structured as a trim strip. At an end side area of the holding element 17, a rear reflector 19 is attached to the holding element 17 by adhesion to an outer side 18 of the holding element 17. As an alternative, the outer side 18 of the holding element 17 can also itself function, with proper construction, as a rear reflector.

So that the bracket 14 is held securely in the locking position shown, a safety element 20 is provided, which inter-engagingly connects the bracket in the locking position with the support 2. Only by detaching this safety element 20 can the bracket 14 be moved by pivoting to the top in the direction of an arrow 21 into an unlocking position, in which one or more lamp units 3 can be removed from the support 2. To replace a light source, it is preferably taken out through an opening, not shown, on the rear wall 9 of the housing 6. Removal of the covering pane 7 is not necessary.

The bracket 14 is preferably made of a plastic material. As an alternative, it can also be made of a metal material.

What is claimed is:

1. Lamp for motor vehicles, especially rear lamps, with a plurality of adjacent chambers each having a light source, in that the chambers are each formed as a lamp unit (3) with a pot-shaped housing (6) defining an opening closed by a covering pane (7) and having the light source, the lamp including a locking device (13) with a mechanism (14, 15, 16, 20) for attaching and detaching the lamp units (3) to and from a common support (2), wherein the mechanism for attaching and detaching includes a holding element (17) that is linked to the common support (2) and can be brought into and out of a locking position that grasps edge areas of the lamp units (3).

2. Lamp according to claim 1, wherein the holding element (17) is elongated and extends perpendicularly to extensions of sidewalls (8) of adjacent lamp units (3) facing each other.

3. Lamp according to claim 2, wherein the attachment mechanism is structured as a U-shaped bracket (14) with legs (15) that are oriented towards the support (2), with free ends (16) of the legs being linked to the support (2), with a pivoting axis thereof extending parallel to the holding element (17) connecting the legs (15).

4. Lamp according to claim 3, wherein the free ends (16) are linked to a rear wall (4) of the support (2).

5. Lamp according to claim 3, wherein at least one leg (15) of the bracket (14) is arranged as a safety element (20) for connecting it to the support (2), so that the bracket (14) can be held in the locking position.

6. Lamp according to claim 1, wherein a first contact element (10) is provided on a rear wall (9) of the lamp units (3) which can be electrically and mechanically connected to a second contact element (11) of the support (2).

7. Lamp according to claim 1, wherein an optical element (19) is arranged at least at a certain area on an outer side (18) of the holding element (17).

8. Lamp according to claim 7, wherein the optical element forms a rear reflector (19).

9. Lamp according to claim 1, wherein the support (2) is structured in the shape of a cuboid and is held in a rectangularly shaped car body opening by inter-engagement of parts.

10. Lamp according to claim 1, wherein each of the lamp units (3) has the same dimensioning.

11. Lamp for motor vehicles, especially rear lamps, with a plurality of adjacent chambers each having a light source, in that the chambers are each formed as a lamp unit (3) with a pot-shaped housing (6) defining an opening closed by a covering pane (7) and having the light source, the lamp including a locking device (13) with an attachment mechanism (14, 15, 16, 20) for attaching and detaching the lamp units (3) to and from a common support (2), wherein the mechanism for attaching and detaching includes a holding element (17) that is linked to the common support (2) and can be brought into and out of a locking position that grasps the lamp units (3), the holding element (17) being elongated and extending perpendicularly to extensions of sidewalls (8) of adjacent lamp units (3) facing each other.

12. Lamp according to claim 11, wherein the attachment mechanism is structured as a U-shaped bracket (14) with legs (15) that are oriented towards the support (2), with free ends (16) of the legs being linked to the support (2), with a pivoting axis thereof extending parallel to the holding element (17) connecting the legs (15).

13. Lamp according to claim 12, wherein the free ends (16) are linked to a rear wall (4) of the support (2).

14. Lamp according to claim 12, wherein at least one leg (15) of a bracket (14) is arranged as a safety element (20) for connecting it to the support (2), so that the bracket (14) can be held in the locking position.

* * * * *